United States Patent
Yoo et al.

(10) Patent No.: US 12,476,324 B2
(45) Date of Patent: Nov. 18, 2025

(54) BATTERY MODULE HAVING IMPROVED GAS VENTING STRUCTURE, AND BATTERY PACK INCLUDING SAME

(71) Applicant: LG ENERGY SOLUTION, LTD., Seoul (KR)

(72) Inventors: Jae Min Yoo, Daejeon (KR); Jeong Oh Moon, Daejeon (KR); Young Bum Cho, Daejeon (KR); Eun Gyu Shin, Daejeon (KR); Seung Joon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 627 days.

(21) Appl. No.: 17/799,527

(22) PCT Filed: Aug. 2, 2021

(86) PCT No.: PCT/KR2021/010035
§ 371 (c)(1),
(2) Date: Aug. 12, 2022

(87) PCT Pub. No.: WO2022/030905
PCT Pub. Date: Feb. 10, 2022

(65) Prior Publication Data
US 2023/0082942 A1 Mar. 16, 2023

(30) Foreign Application Priority Data
Aug. 7, 2020 (KR) .......... 10-2020-0099333

(51) Int. Cl.
H01M 50/383 (2021.01)
H01M 50/204 (2021.01)
(Continued)

(52) U.S. Cl.
CPC ....... *H01M 50/383* (2021.01); *H01M 50/204* (2021.01); *H01M 50/209* (2021.01);
(Continued)

(58) Field of Classification Search
CPC ............ H01M 50/204; H01M 50/209; H01M 50/258; H01M 50/30; H01M 50/383;
(Continued)

(56) References Cited

U.S. PATENT DOCUMENTS

| | | |
|---|---|---|
| 9,281,506 B2 | 3/2016 | Holung et al. |
| 2006/0115714 A1 | 6/2006 | Lee et al. |

(Continued)

FOREIGN PATENT DOCUMENTS

| | | |
|---|---|---|
| CN | 107029507 A | 8/2017 |
| CN | 107240736 A | 10/2017 |

(Continued)

OTHER PUBLICATIONS

Extended European Search Report for European Application No. 21853770.2, dated Jul. 28, 2023.

(Continued)

*Primary Examiner* — Eugenia Wang
(74) *Attorney, Agent, or Firm* — Birch, Stewart, Kolasch & Birch, LLP

(57) ABSTRACT

A battery module has an improved gas venting structure, and a battery pack including the same. Heat emission efficiency of a battery cell can be improved, and the outflow of sparks or embers can be blocked even when a thermal runaway of a battery cell occurs by forming a bracket formed at a position where mesh structures are alternately formed, at an inside a plate where mesh structures are formed.

12 Claims, 4 Drawing Sheets

(51) Int. Cl.
*H01M 50/209* (2021.01)
*H01M 50/258* (2021.01)
*H01M 50/30* (2021.01)
*H01M 50/35* (2021.01)
*H01M 50/358* (2021.01)
*H01M 50/367* (2021.01)

(52) U.S. Cl.
CPC ......... *H01M 50/258* (2021.01); *H01M 50/30* (2021.01); *H01M 50/35* (2021.01); *H01M 50/358* (2021.01); *H01M 50/367* (2021.01); *H01M 50/394* (2021.01)

(58) Field of Classification Search
CPC .. H01M 50/35; H01M 50/358; H01M 50/367; H01M 50/394; H01M 50/20; H01M 50/224; H01M 50/308; H01M 2200/20; H01M 2220/20
See application file for complete search history.

(56) References Cited

U.S. PATENT DOCUMENTS

| | | | |
|---|---|---|---|
| 2009/0220851 A1 | 9/2009 | Nakazawa et al. | |
| 2015/0280190 A1* | 10/2015 | Ohshiba | H01M 50/209 429/100 |
| 2016/0233471 A1* | 8/2016 | Khandelwal | H01M 50/224 |
| 2016/0336556 A1* | 11/2016 | Okutani | H01M 50/213 |
| 2019/0097192 A1 | 3/2019 | Kim et al. | |
| 2019/0131596 A1 | 5/2019 | Yang et al. | |
| 2021/0226290 A1 | 7/2021 | Lee | |

FOREIGN PATENT DOCUMENTS

| | | |
|---|---|---|
| CN | 107452909 A | 12/2017 |
| CN | 107925027 A | 4/2018 |
| CN | 108352472 A | 7/2018 |
| JP | 2011-171175 A | 9/2011 |
| JP | 5088688 B2 | 12/2012 |
| JP | 2020-522855 A | 7/2020 |
| KR | 10-0669410 B1 | 1/2007 |
| KR | 10-2019-0036260 A | 4/2019 |
| KR | 10-2033101 B1 | 10/2019 |
| KR | 10-2057698 B1 | 12/2019 |
| KR | 10-2020-0008624 A | 1/2020 |
| KR | 10-2061872 B1 | 1/2020 |
| KR | 10-2072098 B1 | 1/2020 |
| KR | 10-2020-0041708 A | 4/2020 |
| WO | WO 2017/073201 A1 | 5/2017 |
| WO | WO 2020/075962 A1 | 4/2020 |
| WO | WO 2020/152992 A1 | 7/2020 |

OTHER PUBLICATIONS

International Search Report for PCT/KR2021/010035 mailed on Nov. 9, 2021.
Japanese Office Action for Japanese Application No. 2022-547277, dated Sep. 11, 2023, with English translation.

\* cited by examiner

[FIG. 1]
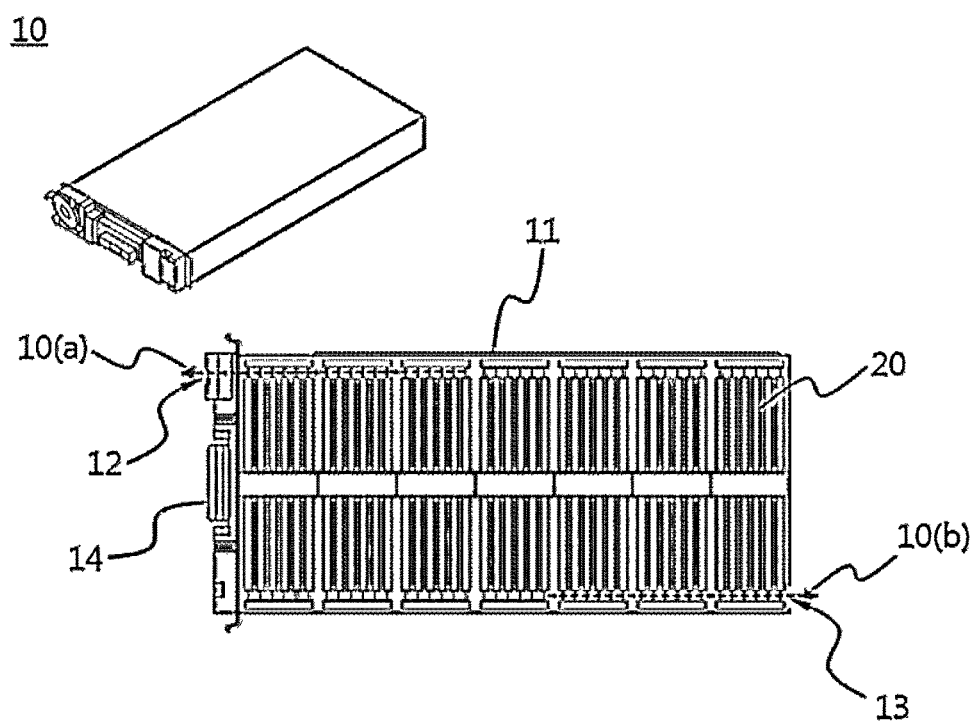
Conventional Art

[FIG. 2]
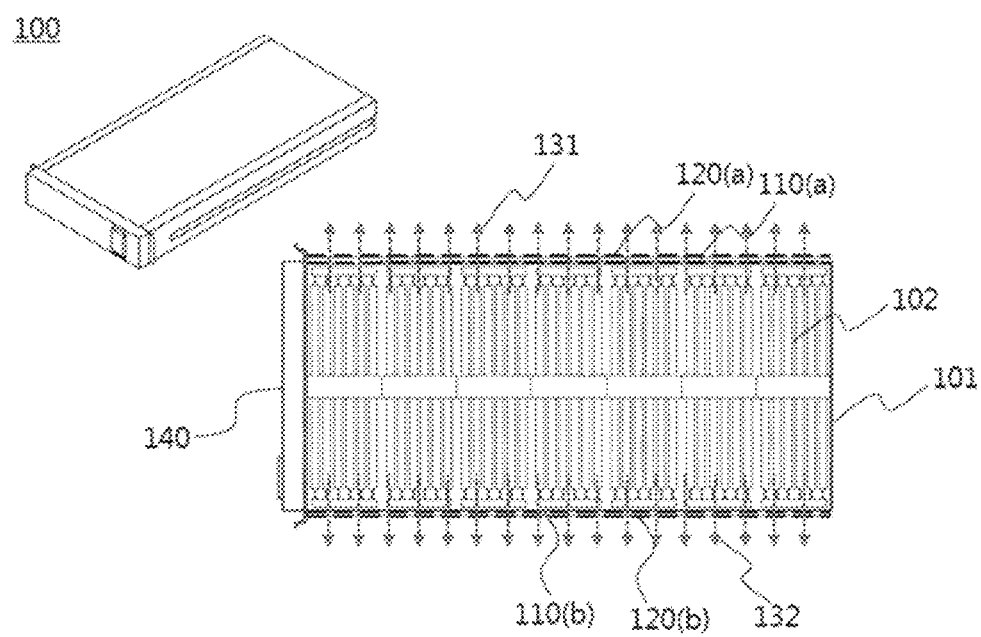

[FIG. 3]
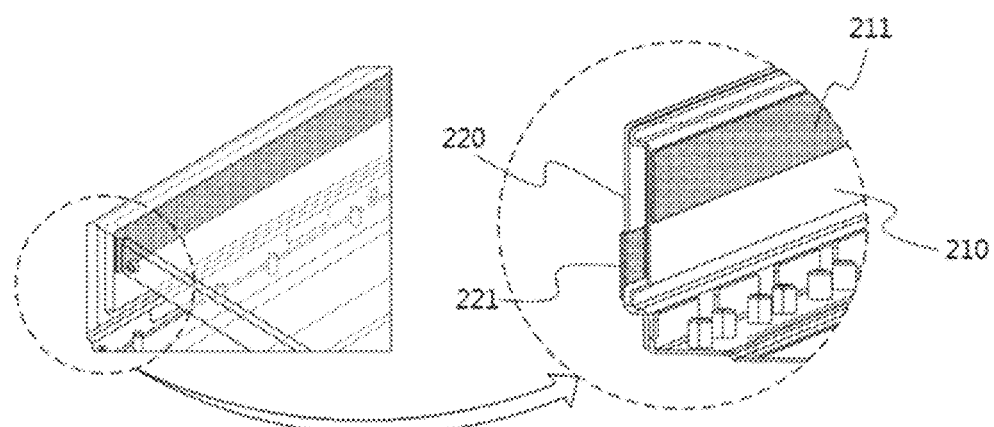

[FIG. 4]
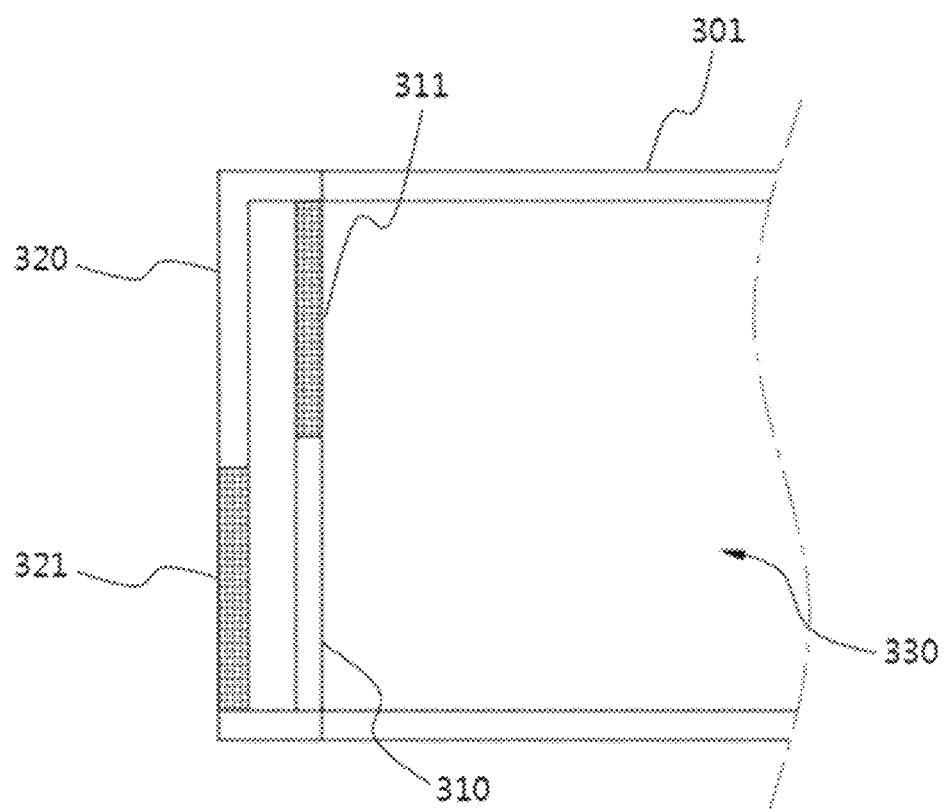

BATTERY MODULE HAVING IMPROVED GAS VENTING STRUCTURE, AND BATTERY PACK INCLUDING SAME

TECHNICAL FIELD

This application claims the benefit of priority based on Korean Patent Application No. 10-2020-0099333, filed on Aug. 7, 2020, and the entire contents of the Korean patent application are incorporated herein by reference.

The present invention relates to a battery module having an improved gas venting structure, and a battery pack including the same.

BACKGROUND ART

In general, a secondary battery is a battery which can be repeatedly used by allowing charging and discharging. The secondary battery consists of one battery module and is used for portable compact electronic devices such as mobile phones, laptops, computers, cameras, camcorders, etc. or consists of a battery pack containing a plurality of cell modules and is used as a power source for driving a motor of a high power hybrid electric vehicle (HEV), electric vehicle (EV), etc.

In particular, electric vehicles use electric energy of a high output, so they need a significant amount of batteries per vehicle. Therefore, there is a need for a battery module obtained by combination of a plurality of battery cells or a battery pack including the battery modules. A plurality of battery cells are accommodated in a battery module, heat is generated in each battery cell during charge/discharge, and the generated heat heats neighboring battery cells again. Particularly, when a thermal runaway of a battery cell occurs due to abnormal operating conditions, sparks or embers are emitted together with heat. In the existing battery module, sparks or embers are emitted together in the process of emitting heat, which may cause flames outside the battery module. Therefore, there is a need for a safety member for quickly emitting generated heat and blocking discharge of sparks and embers to the outside when a thermal runaway of a battery cell occurs. In addition, such a safety member should not occupy excessive volume or degrade process efficiency.

FIG. 1 is a perspective view and a cross-sectional view of a conventional battery module. Referring to FIG. 1, an existing battery module 10 has a structure in which a plurality of battery cells 20 are accommodated in a module case 11. An end plate 14 having a PCM substrate mounted thereon is located on one side surface of the module case 11, and a gas venting hole 10 (a) forming a first gas venting path 12 for gas emission is formed at one side of the end plate 14. The heat or gas discharged in the charge/discharge process of the battery cell is discharged through the gas venting hole 10 (a). However, the gas venting hole 10 (a) is formed to be tilted to one side of the battery module 10, and heat is propagated toward the neighboring battery cells 20 in the process of discharging heat or gas, and gas is not easily discharged. In some cases, an additional gas venting hole 10 (b) forming a second gas venting path 13 may be formed on the opposite side of the end plate 14 in the module case 10. In this case, heat or gas can be more easily discharged. However, there is a limit that in the process of discharging heat or gas, as heat is propagated toward neighboring battery cells 20, heat generated in a specific battery cell 20 is quickly propagated toward neighboring battery cells.

Therefore, there is a need for a technology capable of blocking heat transfer between battery cells 20 accommodated in a battery module 10 while effectively discharging heat or gas in the battery module 10.

PRIOR ART LITERATURE

Patent Document

US Patent Publication No. 2019-0097192

DISCLOSURE

Technical Problem

The present invention is believed to solve at least some of the above problems. For example, an aspect of the present invention provides a battery module having an improved gas venting structure, and a battery pack including the same.

Technical Solution

The present invention provides a battery module. In one example, a battery module according to the present invention includes: a module case having a receiving portion for accommodating a battery cell; and at least one battery cell accommodated in the module case, wherein a gas venting structure is formed on at least one side surface of the module case. Specifically, the gas venting structure includes: a first partition wall including a first gas venting hole and a first mesh structure which covers the first gas venting hole; and a second partition wall spaced apart from an external side of the first partition wall by a predetermined distance, and including a second gas venting hole and a second mesh structure which covers the second gas venting hole. Further, the first gas venting hole formed on the first partition wall and the second gas venting hole formed on the second partition wall are alternately positioned.

In another example, the gas venting structure is formed on two side surfaces of the module case, the two side surfaces facing each other.

In one specific example, an outflow path of a venting gas through the gas venting structure includes two rotation paths, based on a cross-section. For example, each of the rotation paths is a path which is vertically rotated.

In another specific example, an outflow path of a venting gas through the gas venting structure includes: a first rotation path where the venting gas discharged through the first mesh structure formed on the first partition wall is bent while entering a separation space between the first partition wall and the second partition wall; and a second rotation path where the venting gas is bent while being discharged through the second mesh structure formed on the second partition wall after passing through the separation space between the first partition wall and the second partition wall, based on a cross-section.

In one example, each of the first and second gas venting holes has a structure where a perforated structure extends in one direction on the first or second partition wall, or a plurality of holes are formed at regular intervals on a same axis.

In another example, an average diameter ($D1$) of pores formed on the first mesh structure is greater than an average diameter ($D2$) of pores formed on the second mesh structure and satisfies a following condition 1:

$$0.9 \times D1 \geq D2 \geq 0.3 \times D1.$$

In one example, in the battery module according to the present invention, the second partition wall forms an outer surface of the module case, and the first partition wall has a bracket structure which is fastened at an inner side of the second partition wall.

In one example, the module case includes; a plate-shaped bottom plate; and a U-shaped top plate having both ends which are bent in one direction to cover the bottom plate, wherein a gas venting structure is formed at one or two sides among two bent sides of the top plate.

In another example, the at least one battery cell is oriented in a direction perpendicular to a side surface where the gas venting structure of the module case is formed, and is in the module case.

Further, the present invention provides a battery pack including a battery module described above. In one example, a battery pack according to the present invention includes: at least one battery module; and a pack case which packages the battery module.

The first gas venting hole and the second gas venting hole may be alternately positioned in a vertical direction.

Advantageous Effects

According to a battery module and a battery pack including the same of the present invention, excellent heat emitting efficiency is obtained, and the outflow of sparks or embers can be blocked even when a thermal runaway of a battery cell occurs by forming a gas venting structure including first and second partition walls where a mesh structure is formed on one or two side surfaces.

BRIEF DESCRIPTION OF THE DRAWINGS

FIG. 1 is a perspective view of a conventional battery module and a cross-sectional view showing a gas venting path.

FIG. 2 is a perspective view of a battery module and a cross-sectional view showing a gas venting path according to one embodiment of the present invention.

FIG. 3 is an enlarged view showing a gas venting path of a battery module according to one embodiment of the present invention.

FIG. 4 is a partial cross-sectional view showing a gas venting path of a battery module according to another embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention provides a battery module. In one example, a battery module according to the present invention includes: a module case having a receiving portion for accommodating a battery cell; and at least one battery cell accommodated in the module case, wherein a gas venting structure is formed on at least one side surface of the module case. Further, the gas venting structure includes: a first partition wall including a first gas venting hole and a first mesh structure which covers the first gas venting hole; and a second partition wall which is formed to be spaced apart from an external side of the first partition wall by a predetermined distance, and includes a second gas venting hole and a second mesh structure which covers the second gas venting hole, wherein the first gas venting hole formed on the first partition wall and the second gas venting hole formed on the second partition wall are alternately positioned.

The battery module according to the present invention includes a gas venting structure formed of dual partition walls on one or more side surfaces of the module case. The battery module according to the present invention can enhance the emission efficiency of gas or heat, compared to, for example, a structure where a single gas venting structure is formed on an end plate in an existing battery module. In particular, the conventional battery module has a limit that, as heat or gas is discharged toward the gas venting hole, heat is propagated to the neighboring battery cells. However, the present invention has the advantage that when heat or gas is discharged, heat transfer to neighboring battery cells is not caused by forming one surface of the module case in a gas venting structure.

The gas venting structure is formed on one side surface of the module case or two or more side surfaces of the module case. In one example, the gas venting structure is formed on two side surfaces of the module case, in which the side surfaces face each other. By forming the gas venting structure on two side surfaces of the module case, which face each other, heat or gas is smoothly discharged, and a phenomenon that heat or gas is concentrated on a battery cell at a specific location in the battery module is prevented.

In one embodiment, the gas venting structure is formed on the area corresponding to 50 to 100% of the side surface of the module case. Specifically, the gas venting structure has a structure which is formed on the area corresponding to 50 to 95% or 60 to 85% of the side surface of the module case. The formation area of the gas venting structure corresponds to the sum of each area of the first mesh structure formed on the first partition wall and the second mesh structure formed on the second partition wall. The first and second mesh structures may be formed on the area corresponding 15 to 60% or 30 to 50% of the first and second partition walls, respectively. For example, the first mesh structure may be formed on the area corresponding to 40 to 60% of the first partition wall, and the second mesh structure may be formed on the area corresponding to 30 to 50% of the second partition wall. Herein, the areas where the first and second mesh structures are formed do not overlap with each other.

In the present invention, the gas venting structure is a structure formed across an area of at least a certain level, not a structure for forming a particular one hole. This prevents the phenomenon that heat or gas is concentrated in a specific point in the process of discharging heat or gas.

In one example, an outflow path of a venting gas through the gas venting structure includes two rotation paths, based on a cross-section. If the inner gas is emitted immediately without the rotation path, the heat, gas and other conductive components can be discharged together. As a result, a thermal runaway between battery cells or between battery modules may occur. The present invention prevents a thermal runaway phenomenon by configuring the outflow path of venting gas to have two times of rotation path. In a specific example, each of the rotation paths is a path which is vertically rotated.

For example, an outflow path of a venting gas through the gas venting structure includes: a first rotation path where the venting gas discharged through the first mesh structure formed on the first partition wall is bent while entering a separation space between the first partition wall and the second partition wall; and a second rotation path where the venting gas is bent while being discharged through the second mesh structure formed on the second partition wall after passing through the separation space between the first partition wall and the second partition wall, based on a cross-section. In the present invention, the heat or gas inside the battery module is prevented from being discharged directly through the mesh structure formed on the partition wall. Further, as a gas venting hole is formed on a certain area or more of each partition wall, smooth discharge of heat or gas is induced, and a mesh structure formed on each partition wall primarily blocks discharge of conductive particles, etc. Further, by configuring the gas venting structure to rotate twice, it is possible to prevent a thermal runaway phenomenon.

In one example, each of the first and second gas venting holes independently has a structure where a perforated structure is continued in one direction on the first or second partition wall, or a plurality of holes are formed at regular intervals on a same axis. For example, a linear perforated structure is formed on the first partition wall and/or second partition wall, and each mesh structure is located in the corresponding perforated structure or covers the perforated structure. Through this, smooth discharge of heat or gas inside the battery module is induced. For another example, a plurality of holes are formed on the first partition wall and/or second partition wall, and each mesh structure is located in the corresponding perforated structure or covers the perforated structure. Thus, the present invention can prevent a decrease in the mechanical strength of the module case according to the formation of the gas venting hole.

In another example, an average diameter (D1) of pores formed on the first mesh structure is greater than an average diameter (D2) of pores formed on the second mesh structure and satisfies a following condition 2:

$$1.1 \times D2 \geq D1 \geq 3.5 \times D2,$$ [Condition 2]

In the present invention, the first mesh structure located inside has relatively large pores, and the second mesh structure located at the external side has relatively small pores. In a specific example, the average diameter D1 of pores formed on the first mesh structure is the range of 1.1 to 3.5 times, 1.1 to 2.5 times, 1.5 to 3 times, 2 to 3.5 times, or 1.5 to 2.5 times of the diameter D2 of the pores formed on the second mesh structure. The present invention does not exclude the case that the average diameter (D1) of the pores formed in the first mesh structure and the average diameter (D2) of the pores formed in the second mesh structure are on the same level. Through this, the discharge of heat or gas through the first mesh structure is smoothly performed, and particulate elements, which are not filtered in the first mesh structure, are filtered in the second mesh structure. Through this arrangement, the discharge efficiency of the heat or gas in the module case is elevated, and the safety of the battery module can be improved.

In the present invention, the first and second partition walls forming the gas venting structure constitute one side surface of the module case. In one example, the second partition wall forms an outer surface of the module case, and the first partition wall has a bracket structure which is fastened at an inner side of the second partition wall. Specifically, the gas venting structure according to the present invention may be a structure of forming a side surface where a gas venting hole is formed on a module case, and fastening a bracket where a gas venting hole is formed at an inner side or an external side of the side surface where the gas venting hole is formed. Further, a mesh structure is formed to cover each gas venting hole.

In another example, the module case includes: a plate-shaped bottom plate; and a U-shaped top plate having both ends which are bent in one direction to cover the bottom plate, wherein a gas venting structure is formed at one or two sides among two bent sides of the top plate. Specifically, the battery cells are laminated on the bottom plate of the plate-shaped structure, and the U-shaped top plate is positioned to cover the laminated battery cells. In this case, a gas venting structure is formed on one side or both sides of the U-shaped top plate. Through this, it is possible to easily accommodate the battery cells and at the same time, form an effective gas venting structure. As another example of the present invention, the module case may include: a U-shaped bottom plate having both ends which are bent in one direction; and a top plate having a plate-shaped structure which covers the open top surface.

The battery module of the present invention has a structure where a plurality of battery cells are accommodated. In one example, the battery cell is oriented in a direction perpendicular to a side surface where the gas venting structure of the module case is formed, and is accommodated in the module case. In the present invention, the direction in which battery cells are accommodated is perpendicular to the surface on which a gas venting structure is formed. Through this, heat or gas, which is generated from battery cells, is effectively discharged, and at the same time, the influence on neighboring battery cells was minimized during the process of discharging heat or gas. The point that the oriented direction of the battery cell is perpendicular to the side surface where a gas venting structure is formed should be understood to include cases that they cross each other in addition to the case that the angle between them is physically 90 degrees. For example, the cases that the angle is between 80 to 110 degrees may be included.

Further, the present invention provides a battery pack including a battery module described above. In one example, a battery pack according to the present invention includes: at least one battery module; and a pack case which packages the battery module. Since such a battery module is the same as described above, a detailed description thereof will be omitted here. The battery pack can be utilized in various forms, for example, can be used as a power source of a vehicle. For example, the battery pack is applicable as a power source for a hybrid vehicle or an electric vehicle, etc.

DETAILED DESCRIPTION OF THE PREFERRED EMBODIMENTS

Hereinafter, the present invention will be described in more detail through drawings and the like. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

First Embodiment

FIG. 2 is a perspective view of a battery module and a cross-sectional view showing a gas venting path according to one embodiment of the present invention. Referring to FIG. 2, a battery module 100 according to one embodiment of the present invention includes: a module case 101 having a receiving portion for accommodating a battery cell 102 and an end plate 140; and a plurality of battery cells 102 accommodated in the module case 101. A gas venting structure is formed on two side surfaces of the module case 101.

The gas venting structure formed on one surface includes: a first partition wall 110(a) including a first gas venting hole and a first mesh structure which covers the first gas venting hole; and a second partition wall 120(a) which is formed to be spaced apart from an external side of the first partition wall 110(a) by a predetermined distance, and includes a second gas venting hole and a second mesh structure which covers the second gas venting hole, wherein the first gas venting hole formed on the first partition wall 110(a) and the second gas venting hole formed on the second partition wall 120(a) are alternately positioned. The heat or gas generated from the accommodated battery cell 102 is discharged along the gas venting path 131 of the side surface where the gas venting structure is formed.

The gas venting structure formed on another surface includes: a first partition wall 110(b) including a first gas venting hole and a first mesh structure which covers the first gas venting hole; and a second partition wall 120(b) which is formed to be spaced apart from an external side of the first partition wall 110(b) by a predetermined distance, and includes a second gas venting hole and a second mesh structure which covers the second gas venting hole, wherein the first gas venting hole formed on the first partition wall 110(b) and the second gas venting hole formed on the second partition wall 120(b) are alternately positioned. The heat or gas generated from the accommodated battery cell 102 is discharged along the gas venting path 132 of the side surface where the gas venting structure is formed.

In the present invention, by forming the gas venting structure on two side surfaces of the module case, which face each other, heat or gas is smoothly discharged, and a phenomenon that heat or gas is concentrated on a battery cell at a specific location in the battery module is prevented.

Second Embodiment

FIG. 3 is an enlarged view showing a gas venting path of a battery module according to one embodiment of the present invention. Referring to FIG. 3, an outflow path of a venting gas through the gas venting structure in the present invention includes two rotation paths, based on a cross-section.

The module case according to the present invention includes: a plate-shaped bottom plate; and a U-shaped top plate having both ends which are bent in one direction to cover the bottom plate, wherein a gas venting structure is formed at two bent sides of the top plate. The gas is discharged to the outside by sequentially passing the first and second partition walls 210 and 220. The bent end of the U-shaped top plate forms the second partition wall 220. Further, a bracket fastened with a predetermined distance forms the first partition wall 210 at the inner side of the second partition wall 220.

Specifically, an outflow path of a venting gas through the gas venting structure includes: a first rotation path where the venting gas discharged through the first mesh structure 211 formed on the first partition wall 210 is bent while entering a separation space between the first partition wall 210 and the second partition wall 220; and a second rotation path where the venting gas is bent while being discharged through the second mesh structure 221 formed on the second partition wall 220 after passing through the separation space between the first partition wall 210 and the second partition wall 220, based on a cross-section.

In the present invention, the heat or gas inside the battery module is prevented from being discharged in a straight line path directly through the mesh structure formed on the partition wall. Further, a gas venting hole is formed on an area corresponding to about 50% of the first partition wall 210 on the first partition wall 210, thereby inducing smooth discharge of heat or gas and primarily blocking discharge of conductive particles, etc. Further, a gas venting hole is formed on an area corresponding to about 40% of the second partition wall 220 on the second partition wall 220, thereby inducing smooth discharge of heat or gas and primarily blocking discharge of conductive particles, etc. Further, by configuring the gas venting structure to rotate twice, it is possible to prevent a thermal runaway phenomenon.

Third Embodiment

FIG. 4 is a partial cross-sectional view showing a gas venting path of a battery module according to another embodiment of the present invention. Referring to FIG. 4, a receiving portion 330 for accommodating a battery cell is formed in a module case 301, and a gas venting structure is formed at one end of the module case 301. The gas venting structure includes a first partition wall 310 located at the inner side and a second partition wall 320 located at the external side.

An outflow path of a venting gas through the gas venting structure includes: a first vertical rotation path where the venting gas discharged through the first mesh structure 311 formed on the first partition wall 310 is bent while entering a separation space between the first partition wall 310 and the second partition wall 320; and a second vertical rotation path where the venting gas is bent while being discharged through the second mesh structure 321 formed on the second partition wall 320 after passing through the separation space between the first partition wall 310 and the second partition wall 320, based on a cross-section.

In this case, the first mesh structure 311 located inside has relatively large pores, and the second mesh structure 312 located at the external side has relatively small pores. Specifically, the average diameter D1 of the pores formed on the first mesh structure 311 is about a double the average diameter D2 of the pores formed on the second mesh structure 321. Further, the separation distance between the first partition wall 310 and the second partition wall 320 is about 1 to 5 mm.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

The invention claimed is:

1. A battery module comprising:
a module case having a bottom plate and a top plate spaced from each other in a vertical direction, a pair of side surfaces spaced from each other in a first horizontal direction, a pair of end surfaces spaced from each other in a second horizontal direction, and a receiving portion for accommodating a battery cell; and a plurality of battery cells stacked in the module case and stacked in the second horizontal direction, wherein a gas venting structure is formed on at least one side surface of the pair of side surfaces, wherein the gas venting structure includes:

a first partition wall including a first gas venting hole and a first mesh structure which covers the first gas venting hole; and a second partition wall spaced apart from an external side of the first partition wall by a predetermined distance, and including a second gas venting hole and a second mesh structure which covers the second gas venting hole, wherein the first gas venting hole formed on the first partition wall and the second gas venting hole formed on the second partition wall are alternately positioned in the vertical direction.

2. The battery module of claim 1, wherein the gas venting structure is formed on both of the pair of side surfaces of the module case, the pair of side surfaces facing each other.

3. The battery module of claim 1, wherein an outflow path of a venting gas through the gas venting structure includes two rotation paths, based on a cross-section.

4. The battery module of claim 3, wherein each of the rotation paths is a path which is vertically rotated.

5. The battery module of claim 1, wherein an outflow path of a venting gas through the gas venting structure includes:

a first rotation path where the venting gas discharged through the first mesh structure formed on the first partition wall is bent while entering a separation space between the first partition wall and the second partition wall; and a second rotation path where the venting gas is bent while being discharged through the second mesh structure formed on the second partition wall after passing through the separation space between the first partition wall and the second partition wall, based on a cross-section.

6. The battery module of claim 1, wherein each of the first and second gas venting holes has a structure where a perforated structure extends in one direction on the first or second partition wall, or a plurality of holes are formed at regular intervals on a same axis.

7. The battery module of claim 1, wherein an average diameter D1 of pores formed on the first mesh structure is the range of 1.1 to 3.5 times of the diameter D2 of the pores formed on the second mesh structure.

8. The battery module of claim 1, wherein the second partition wall forms an outer surface of the module case, and wherein the first partition wall has a bracket which is fastened at an inner side of the second partition wall.

9. The battery module of claim 1, wherein the bottom plate is plate-shaped, wherein the top plate is U-shaped with opposite ends which are bent in one direction to cover the bottom plate, and wherein the gas venting structure is formed at one or two sides among two bent sides of the top plate.

10. The battery module of claim 1, wherein the gas venting structure of the module case is formed in at least one of the pair of side surfaces.

11. A battery pack comprising:

at least one battery module according to claim 1; and a pack case which packages the at least one battery module.

12. The battery module of claim 1, wherein the first gas venting hole and the second gas venting hole are alternately positioned in a vertical direction.

* * * * *